Dec. 13, 1932.                W. A. MORTON ET AL                 1,890,883
                           WARE TRANSFERRING MECHANISM
                     Filed Aug. 26, 1927          2 Sheets-Sheet 1
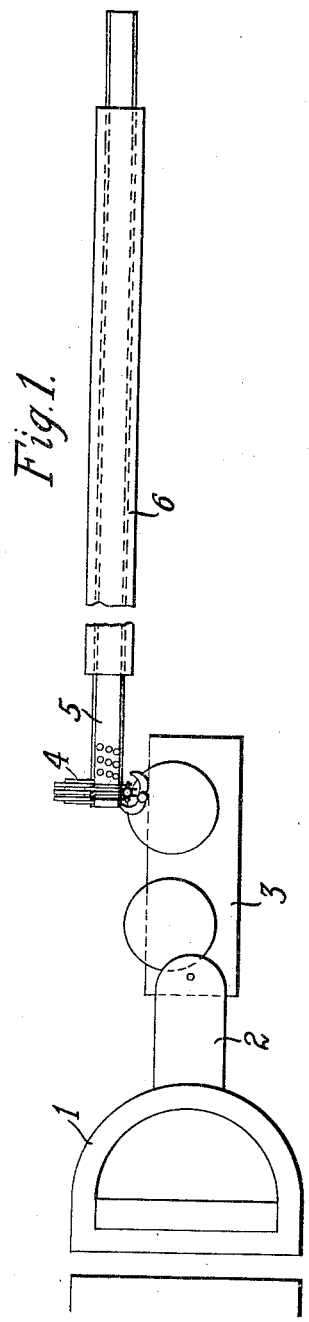
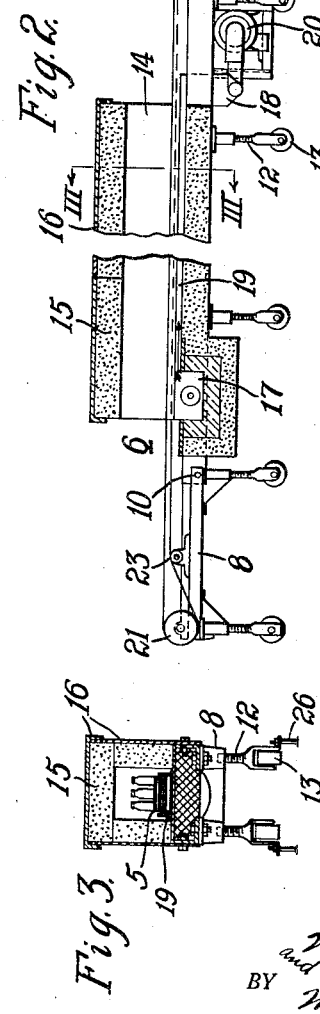
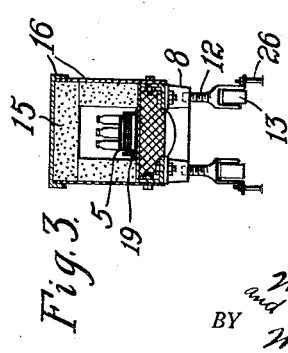
INVENTOR.
William A. Morton
and Paul L. Geer
BY William B. Jaspert
ATTORNEYS.

Dec. 13, 1932.                W. A. MORTON ET AL                1,890,883
                           WARE TRANSFERRING MECHANISM
                           Filed Aug. 26, 1927     2 Sheets-Sheet 2
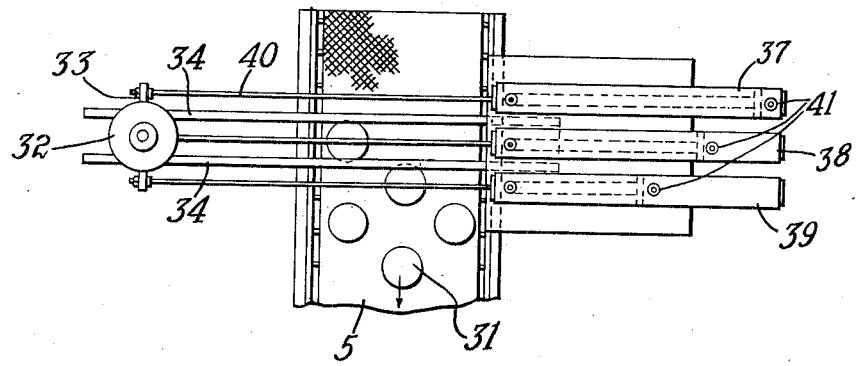
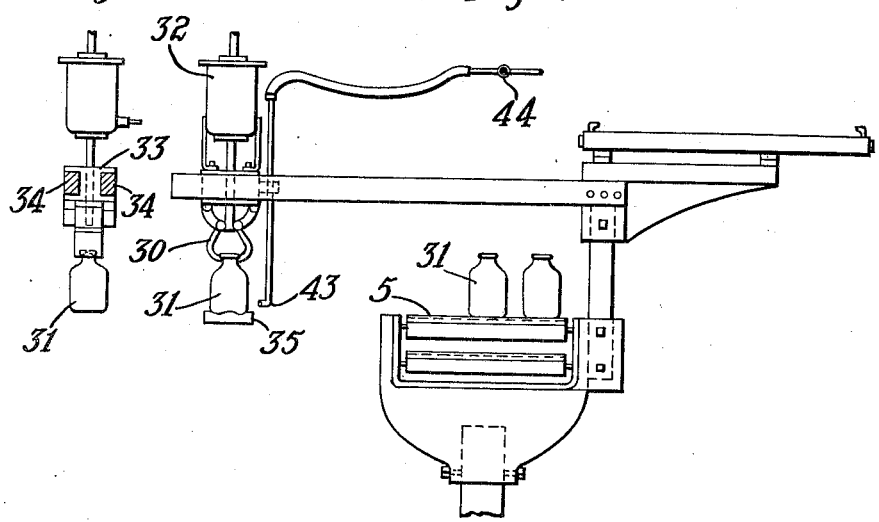
INVENTOR.
William A. Morton
and Paul L. Geer
BY William B. Jaspert
ATTORNEYS.

Patented Dec. 13, 1932

1,890,883

UNITED STATES PATENT OFFICE

WILLIAM A. MORTON, OF PITTSBURGH, AND PAUL L. GEER, OF BELLEVUE, PENNSYLVANIA, ASSIGNORS TO AMCO, INCORPORATED, OF PITTSBURGH, PENNSYLVANIA, A CORPORATION OF PENNSYLVANIA

WARE TRANSFERRING MECHANISM

Application filed August 26, 1927. Serial No. 215,614.

This invention relates to a method of and apparatus for treating glass ware, more particularly for the handling of glass ware after it is removed from the forming machine.

It is among the objects of this invention to provide a method and apparatus for treating glass ware which shall greatly facilitate the handling of the articles when transferring them from the forming machine to the heat treating lehr.

Another object of the invention is the provision of a special take-out device which is independent of the forming machine and which is adapted to place the formed articles on a lehr conveyor in transversely spaced rows while the conveyor is in motion, whereby substantially all of the supporting surface of the conveyor is efficiently utilized in the transportation of the articles through the annealing furnace.

These and other objects will become more apparent from a description of the accompanying drawings in which like reference characters designate like parts and in which Fig. 1 is a diagrammatic view illustrating a glass melting furnace, a glass feeder stub, a glass ware forming machine, a take-out device, and a heat treating lehr operating in accordance with the principles of this invention; Fig. 2 is a longitudinal sectional elevational view of the lehr; Fig. 3 a vertical sectional elevational view of the lehr furnace taken along the line III—III, Fig. 2; Fig. 4 is a plan view of the take-out device and a portion of the conveyor mechanism; Fig. 5 a side elevational view of the take-out device; and Fig. 6 a sectional elevational view of the gripper mechanism for engaging the glass ware as will be hereinafter more fully explained.

Referring to Figs. 1 and 2 of the drawings, the structure therein illustrated comprises a glass furnace 1, a feeder stub 2 and a ware forming machine 3, which are herein illustrated as cooperating in the forming of glass ware in a manner well known in the art, and which constitutes no part of the present invention. The take-out device generally designated at 4, is more clearly illustrated in Figs. 4 and 5, and functions to deposit glass ware which is removed from the forming machine to the extended end portion 5 of the lehr conveyor which traverses the lehr or heat treating furnace 6.

The lehr, generally designated at 6, comprises a sectional support consisting of a mid or central section 7 and end sections 8 and 9, the section 8 being pivotally joined to the central section 7 at 10, and the end section 9 is connected to the central section 7 by a screw mechanism 11 which is adapted to provide longitudinal adjustment of the frame sections to vary the tension of the conveyor belt 5. The frames 7, 8 and 9 are supported on adjustable legs 12 carrying rollers 13 to facilitate transporting the entire furnace from place to place in accordance with the demand on its use, and the end legs on the frame section 8 are further adjustable to elevate the extended end of the conveyor 5 or lower the same in accordance with the height of the ware which it is necessary to handle.

The furnace structure comprises an annealing tunnel 14 which is shown in Fig. 2 to be broken off, and which is, in actual use, of considerable length. The tunnel is formed of insulating material 15 protected by metal covering material 16. At one end of the tunnel a combustion chamber 17 is provided and at its other end an exhaust chamber 18 with a flue or passage 19 communicating with the respective chambers, to take off the products of combustion and conduct them along the full length of the annealing tunnel. Suitable equipment, such as a motor driven fan or blower, 20, is provided to evacuate chamber 18 and to draw the hot gases through the passage 19. The passage or duct 19 formed by the metallic walls is a single unit structure, which supports both the going and returning strands of the ware conveyor independent of the side walls or floor of the tunnel. The metallic portions are free to expand independent of the lehr floor and side walls. The tunnel is covered with sectional pieces of insulation for ready access to the interior of the lehr.

The conveyor 5 comprises an endless belt of fabricated wire which is passed over the rollers 21 and 22 mounted on the ends of sections 8 and 9 of the supporting frame and guide rollers 23 and 24. The roller 22 is driven by a motor 25 that is mounted in the end section 9.

Referring to Fig. 3 of the drawings, it will be noted that both the upper and lower portions of the conveyor 5 are above the flue passage 19 so that the lower strand of the conveyor is not subjected to a cooling temperature on its return movement to the charging end of the furnace, and it will be observed in Fig. 3 that the end legs of the frame may be fastened by clamping bolts 26 which function as temporary anchors when the machine is placed in its operative position with respect to the forming machine as shown in Fig. 1.

Referring to Figs. 4, 5 and 6 of the drawings, the take-out device comprises a toggle clamp or gripper 30 which is adapted to engage the glass ware, such as a bottle 31, on the forming machine as it is brought in alinement with the take out device, and the toggle mechanism is actuated by a fluid pressure cylinder 32 that is carried by a pusher head 33 which is movably mounted in a pair of guide rails 34. The pusher head traverses the guide rails from a position directly over the discharge portion 35 of the forming machine to the remote edge of the conveyor 5 and is actuated in its movement by a plurality of fluid pressure actuated pistons which are disposed in cylinders 37, 38 and 39. The piston members are respectively connected by rods 40 to the pusher head.

The piston rods 40 are of different lengths, as shown by the location of the ports 41 and they are successively operated to bring the pusher head of the take-out device in different positions over the conveyor belt 5, such positions being illustrated by the transverse spacing of the glass articles 31 on the conveyor belt in Fig. 4.

In operation, the pusher head 33 is brought to its extended position as shown in Fig. 4, and after receiving the article 31 from the forming machine, it is actuated by cylinder 37 to move on the rails 34 to the innermost position of the article on the conveyor belt 5. The article 31 is there released and deposited on the conveyor belt. The pusher head is then again extended to engage another bottle 31 and it is returned to the conveyor mechanism by the cylinder 38, the piston of which is of such stroke that the bottle 31 is deposited at or near the central portion of the conveyor belt and upon the subsequent removal of a bottle from the forming machine, the pusher head is actuated by the cylinder 39 which returns it to the edge of the conveyor belt furthest remote from the actuating cylinders and the ware is deposited in the position shown in Fig. 4. On account of the conveyor belt 5 being in constant motion in the direction of the arrow during the operation of the take out device, the ware will be deposited in transversely spaced rows at a slight angle to the transverse plane of the conveyor, as shown in Fig. 4. The operation of the take out device and the speed of the conveyor are so related that when the last bottle has been deposited on the conveyor belt, thus completing one row, the next full stroke of the pusher head will clear the bottle last deposited on the conveyor, but outside of this relative function of the conveyor and take out device, no particular coordination of function is necessary.

The ware as it is removed from the forming machine, is sufficiently plastic to take the imprint of the wire fabric belt conveyor on which it is placed and to prevent this, a cooling air blast is applied to the article from an air pipe 43 which is mounted on the pusher head 33 to traverse back and forth with the latter on the rails 34. The air supply in the pipe line 43 may be controlled by a valve 44, Fig. 5.

By the use of the take-out device and lehr furnace, as herein set forth, the production of a glass forming machine can be handled with facility and dispatch and by a minimum of mechanical equipment or manual labor. By placing the ware in transversely spaced rows in the manner illustrated, the length of the lehr furnace may be materially reduced, thus reducing the cost of equipment and economizing on floor space; and by employing a take-out device of the construction described herein, the ware is subjected to but a single contact during its removal from the forming machine to the lehr, thus assuring that all of the ware enters the heat treating furnace at a substantially uniform temperature. It is also evident that the special construction of the lehr permits of quick and simple vertical adjustment of the conveyor belt and receiving portion of the conveyor and in addition provides an efficient heating unit which assures a uniform treatment of the product.

Although one of the embodiments of the invention has been herein illustrated and described, it will be obvious to those skilled in the art that various modifications may be made in the details of construction and in the design and arrangement of the several cooperating parts without departing from the principles herein set forth.

We claim:

1. Apparatus for transferring glass articles from a forming machine, comprising a horizontal guide, a gripper movable on said guide, a plurality of fluid pressure cylinders having expansion chambers of different lengths, pistons in said chambers connected at one end to said gripper, and fluid pressure means for said cylinders to successively actuate the several pistons to thereby subject said gripper to reciprocating movement to different positions on said guide.

2. Apparatus for transferring articles of glassware from a fixed receiving station to different delivery stations, comprising ware gripping means movable in a horizontal plane and operating mechanism therefor consisting of a plurality of independently operable actuating means which in one direction of their travel extend said ware gripping means to said fixed receiving station and in their other direction of travel stop said gripping means at different delivery stations.

In testimony whereof, we have hereunto set our hands.

WILLIAM A. MORTON.
PAUL L. GEER.